United States Patent
Zellner, Jr. et al.

(10) Patent No.: US 8,616,607 B2
(45) Date of Patent: Dec. 31, 2013

(54) INSTRUMENT PANEL ASSEMBLY

(75) Inventors: Kerry Scott Zellner, Jr., Saline, MI (US); Benjamin Warren Penner, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/432,830

(22) Filed: Mar. 28, 2012

(65) Prior Publication Data

US 2013/0257085 A1    Oct. 3, 2013

(51) Int. Cl.
*B62D 25/14* (2006.01)

(52) U.S. Cl.
USPC .......................................................... 296/70

(58) Field of Classification Search
USPC .......................................................... 296/70
See application file for complete search history.

(56) References Cited

U.S. PATENT DOCUMENTS

| | | | | |
|---|---|---|---|---|
| 4,668,004 A * | 5/1987 | Tsunoda et al. | ................ | 296/70 |
| 4,943,107 A * | 7/1990 | Rhodes, Jr. | ...................... | 296/70 |
| 5,294,164 A * | 3/1994 | Shimabara et al. | ............. | 296/72 |
| 5,823,602 A * | 10/1998 | Kelman et al. | .................. | 296/70 |
| 5,927,790 A * | 7/1999 | Futschik et al. | ................ | 296/70 |
| 6,129,406 A * | 10/2000 | Dauvergne | ....................... | 296/70 |
| 6,517,101 B1 * | 2/2003 | Bemis et al. | ............... | 280/728.3 |
| 6,550,835 B2 * | 4/2003 | Davis et al. | ................ | 296/37.12 |
| 6,802,559 B2 | 10/2004 | Yoshihara et al. | | |
| 7,036,865 B2 * | 5/2006 | Sato et al. | ........................ | 296/70 |
| 7,475,933 B2 * | 1/2009 | Doskocz | ..................... | 296/97.23 |
| 7,503,608 B1 * | 3/2009 | Shahidehpour | ................. | 296/29 |
| 7,543,871 B2 * | 6/2009 | Quigley et al. | ............ | 296/24.34 |
| 7,819,456 B2 * | 10/2010 | Robertson | ........................ | 296/70 |
| 7,862,098 B2 * | 1/2011 | Biggs et al. | .................. | 296/37.8 |
| 7,954,886 B2 | 6/2011 | Kinoshita et al. | | |
| 7,997,638 B2 | 8/2011 | Inami et al. | | |
| 2002/0079677 A1 * | 6/2002 | Skirha et al. | ............... | 280/728.3 |
| 2006/0237988 A1 * | 10/2006 | Niimi | .............................. | 296/70 |
| 2007/0014969 A1 * | 1/2007 | Olley et al. | .................... | 428/104 |
| 2008/0023979 A1 * | 1/2008 | Trillat et al. | .................... | 296/70 |

FOREIGN PATENT DOCUMENTS

JP          8132921 A        5/1996
JP       2011-235736 A      11/2011

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

The instrument panel assembly for an automotive vehicle includes an instrument panel and a component. The instrument panel includes an exterior surface and a cutout portion having a base which is recessed from the exterior surface. The cutout portion includes an inner wall extending between the base and the exterior surface of the instrument panel. The component attaches to the instrument panel. The component includes an engagement portion located at a distal end. The distal end of the engagement portion is at least partially received within the cutout portion of the instrument panel. The engagement of the distal end of the engagement portion of the component within the cutout portion of the instrument panel provides a continuous contact between the outer surface of the engagement portion and the inner wall of the cutout portion.

9 Claims, 4 Drawing Sheets

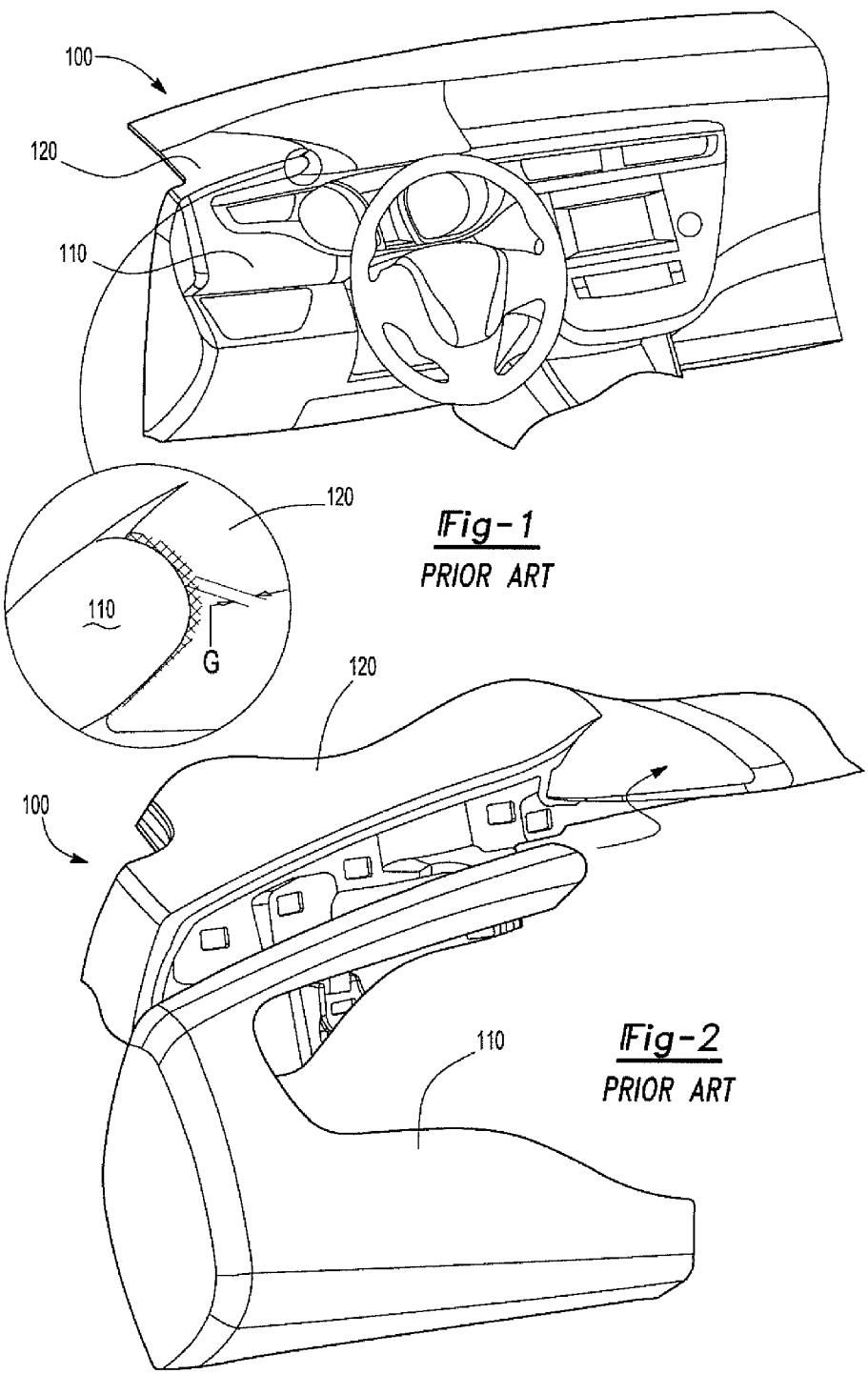

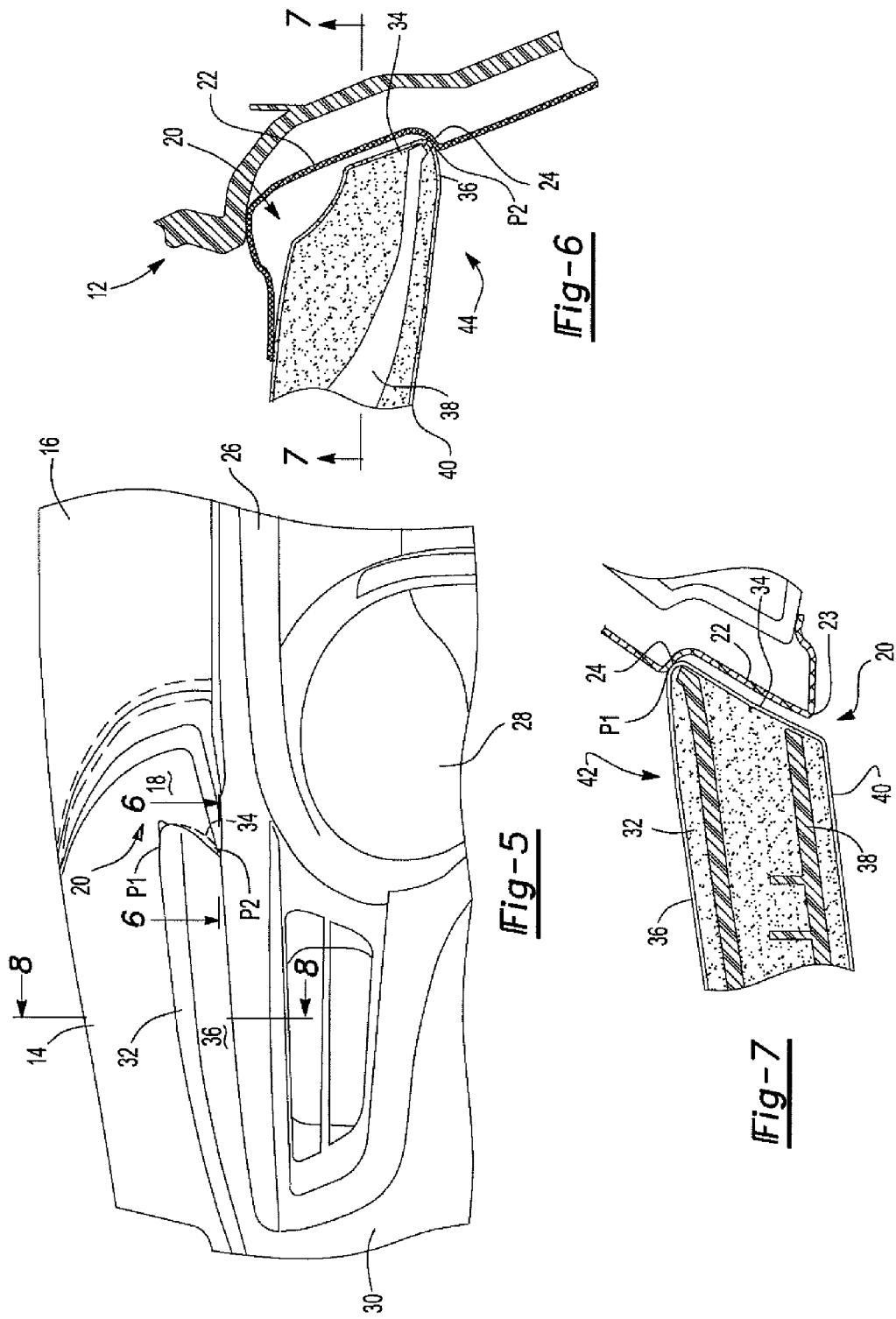

INSTRUMENT PANEL ASSEMBLY

FIELD OF THE INVENTION

The present invention is directed to an instrument panel assembly for use in an automotive vehicle. More particularly, the present invention is directed to an instrument panel assembly in which an engagement portion of a component is at least partially received within a cutout portion recessed from an exterior surface of an instrument panel.

BACKGROUND OF THE INVENTION

Modern automotive vehicles typically employ instrument panels assemblies including instrument panels and instrument clusters that house various vehicle instruments such as speedometer, tachometer, and odometer. The instrument panel is often provided with additional garnish pads or components which attach to the instrument panel to provide a pleasant aesthetic appearance to the instrument panel. By attaching the garnish pad to the instrument panel, the instrument panel assembly can be formed from a variety of materials.

In previously known instrument panels the garnish pad was formed of a solid rigid material along with the instrument panel itself. With reference to FIGS. 1 and 2, if the garnish pad 110 was formed with any deviation in dimensions, such as being formed shorter than the required dimensions, a gap G resulted from the attachment of the garnish pad 110 and the instrument panel 120. As such the instrument panel assembly 100 had a diminished appearance due to the gap G. Further, if the garnish pad 110 was formed longer than the required dimensions, the attachment results in a crease or wrinkle formed at the contact between the garnish pad 110 and the instrument panel 120.

Thus, there exists a need in the art to provide an instrument panel assembly having a garnish pad and instrument panel which are capable of absorbing deviations and variations in the garnish pad to provide a continuous connection between the garnish pad and instrument panel.

SUMMARY OF THE INVENTION

The present invention provides an instrument panel assembly for use in an automotive vehicle which overcomes the above described problems resulting in variations of garnish pad length which diminish the appearance of the instrument panel by having gaps or wrinkles and creases.

In brief, the instrument panel assembly for an automotive vehicle includes an instrument panel and a component. The instrument panel includes an exterior surface and a cutout portion having a base which is recessed from the exterior surface. The cutout portion includes an inner wall extending between the base and the exterior surface of the instrument panel. The component attaches to the instrument panel. The component includes an engagement portion having an outer surface. The engagement portion is at least partially received within the cutout portion of the instrument panel. The engagement portion of the component within the cutout portion of the instrument panel provides a continuous contact between the outer surface of the engagement portion and the inner wall of the cutout portion.

The instrument panel optionally includes a dash portion and a hood portion. The hood portion extends outwardly from the dash portion which is positioned on one side of the hood portion. The cutout portion is formed at the junction between the hood portion and the dash portion.

BRIEF DESCRIPTION OF THE DRAWINGS

A better understanding of the present invention will be had upon reference to the following detailed description when read in conjunction with the accompanying drawings, wherein like reference characters refer to like parts throughout the views and in which:

FIG. 1 is a front side perspective view of a previously known instrument panel;

FIG. 2 is a partial exploded perspective view of the previously known instrument panel;

FIG. 5 is a front side view illustrating the engagement of the component in the instrument panel;

FIG. 6 is a partial cross-sectional view taken along the line 6-6 of FIG. 5;

FIG. 7 is a partial cross-sectional view taken along the line 7-7 of FIG. 6.

DETAILED DESCRIPTION OF THE INVENTION

The present invention has utility as an instrument panel assembly for use with an automotive vehicle which overcomes the above mentioned disadvantages. The inventive instrument panel assembly includes an instrument panel having a cutout portion. The cutout portion is defined by a base and an inner wall that extends from the base potion to the exterior surface of the instrument panel. A component for attaching to the instrument panel includes an engagement portion having an outer surface. The engagement portion is at least partially received within the cutout portion to provide a continuous contact between the outer surface of the engagement portion and the inner wall of the cutout portion.

Figure 3:
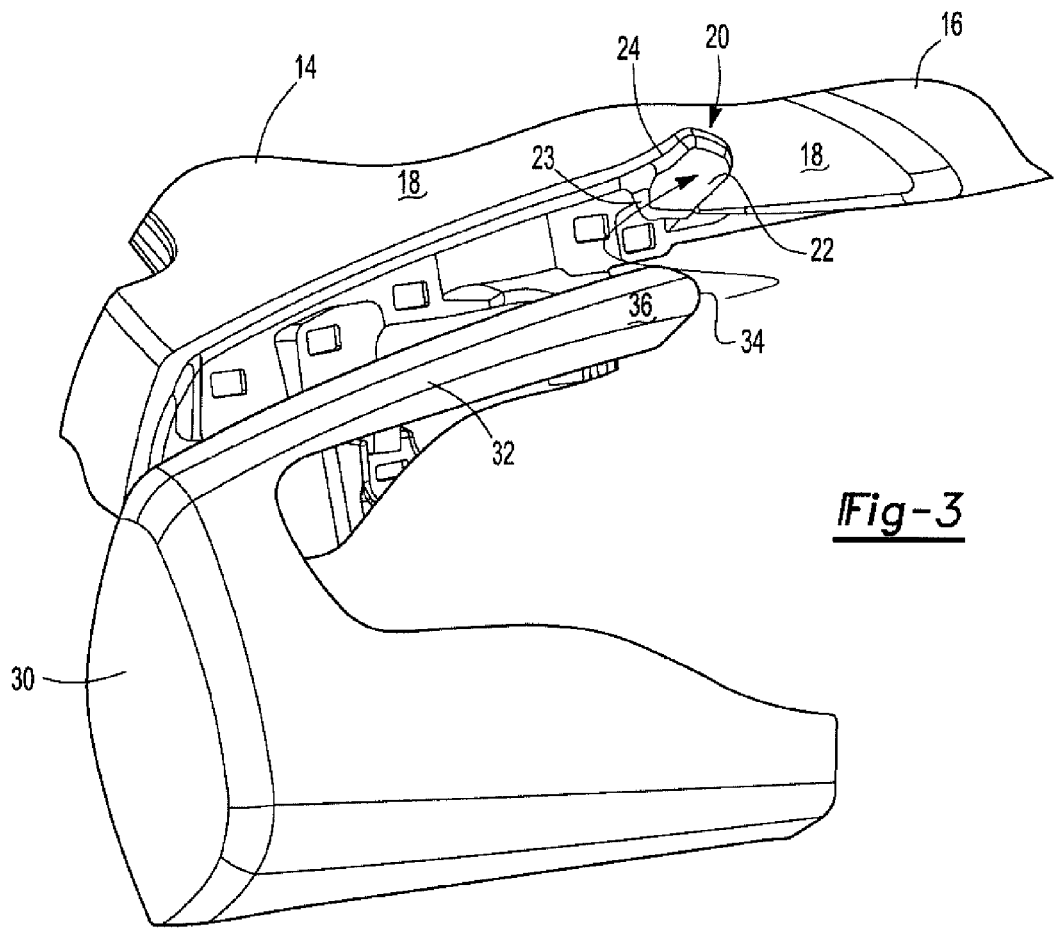
FIG. 3 is a partial exploded view of the inventive instrument panel assembly.
Figure 4:
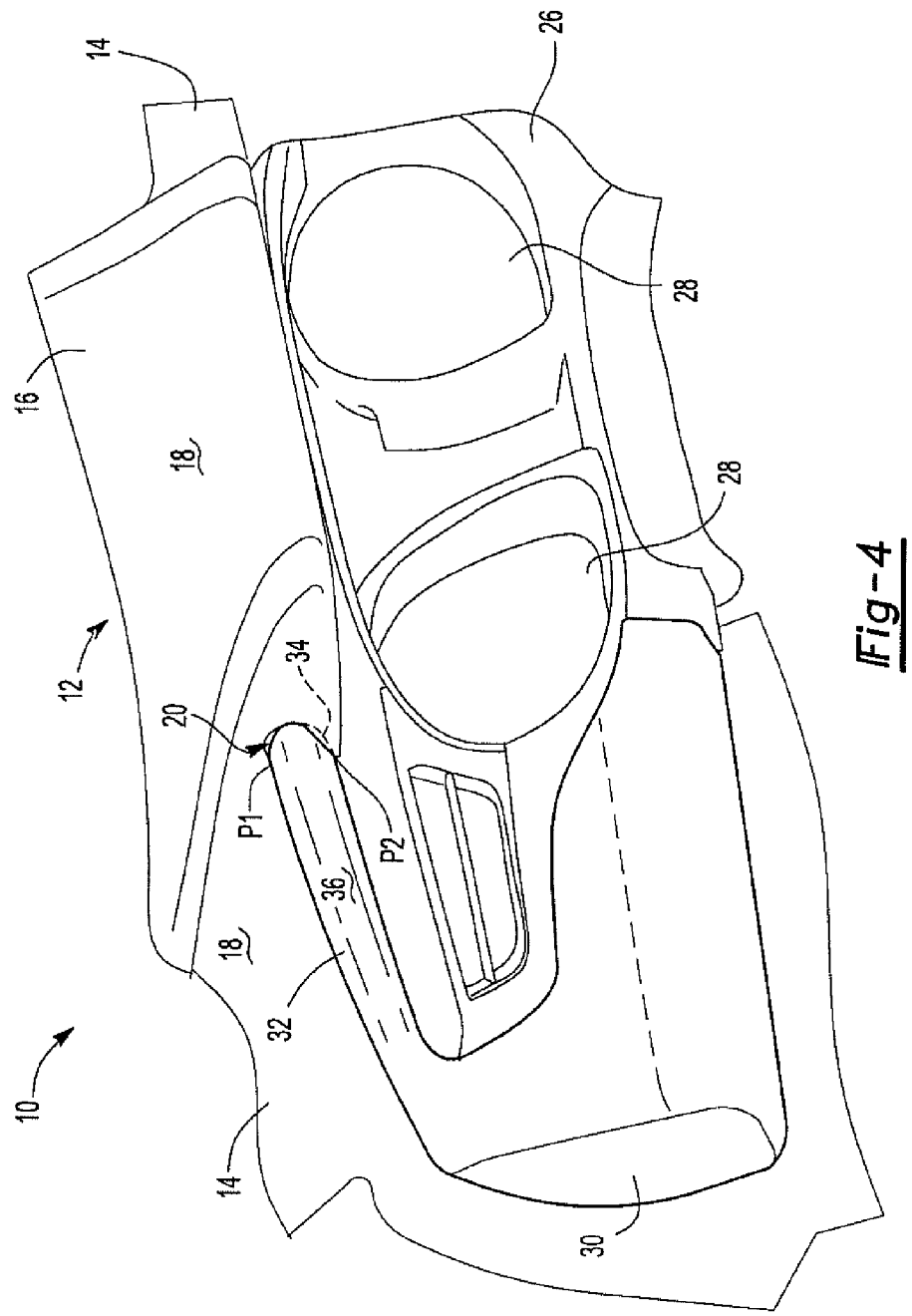
FIG. 4 is a partial front perspective view illustrating the engagement of the component in the instrument panel.

With reference to FIGS. 3-5, the inventive panel assembly is generally illustrated at 10. The panel assembly 10 includes an instrument panel 12, a garnish pad or component 30, and an instrument cluster 26. The instrument panel 12 includes a dash portion 14 and a hood portion 16. The instrument panel 12 has an exterior surface 18 that covers the exterior of the dash portion 14 and the hood portion 16.

The hood portion 16 is positioned so as to extend outwardly from the dash portion 14. The dash portion 14 extends from either side of the hood portion 16. The hood portion 16 is positioned outwardly and above the instrument cluster 26. The instrument cluster 26 includes gauge portions 28 for including various instrument gauges of the automotive vehicle illustratively including tachometer, speedometer, and odometer.

A cutout portion 20 is provided in the instrument panel 12. Specifically, the cutout portion 20 is provided at a junction of the dash portion 14 and the hood portion 16. The cutout portion 20 includes a base 22 which is recessed from the exterior surface 18 of the instrument panel 12. An inner wall 24 extends between the base 22 and the exterior surface 18. The inner wall 24 partially bounds the base 22 and has a generally inverted U-shape. The cutout portion 20 includes an open face 23 which is the portion of the base 22 that is not bound by the inner wall 24. The open face 23 is positioned opposite a hood side portion of the inner wall 24 which is a portion of the inner wall 24 that is adjacent the hood portion 16 of the instrument panel 12. The open face 23 is positioned on a bottom side of the base 22, in the vehicle height direction, and is positioned between the ends of the inner wall 24. The open face 23 of the cutout portion 20 allows for the component 30 to be connected to the instrument panel 12 in an abutting contact.

The garnish pad or component 30 is operably attached to the instrument panel 12, by a plurality of clips (not show). The clips extend from a back side that is a forward most side of the component 30 in the vehicle longitudinal direction, and engage with apertures formed on the instrument panel 12 to secure the component 30 to the instrument panel 12. It is appreciated, of course, that the attachment of the component 30 to the instrument panel 12 is limited to clips, such as fasteners, adhesive, or snap in fittings.

The component 30 includes an engagement portion 32. The engagement portion 32 includes an arcuate or convex outer surface 36 which corresponds to the curved shape of the hood side portion of the inner wall 24 and engages with the cutout portion 20. The engagement portion 32 includes an inner surface opposite the outer surface 36. The engagement portion 32 is an elongated portion of the component 30 having a distal end 34 that is received within the cutout portion 20. The engagement portion 32 has a generally arcuate cross section, as best seen in FIG. 8.

During assembly of the instrument panel assembly 10, at least of portion of the engagement portion 32 is received within the cutout portion 20 such that the outer surface 36 of the engagement portion 32 is in continuous contact with an inner surface of the inner wall 24 of the hood side portion of the cutout portion 20. Specifically, the distal end 34 of the engagement portion is positioned in the cutout portion 20 between the exterior surface 18 of the instrument panel 12 and the base 22, as seen in FIGS. 4 and 6. Upon attachment of the component 30 to the dash portion 14 of the instrument panel 12 the outer surface 36 of the engagement portion 32 is exposed to a passenger compartment of the automotive vehicle, and the inner surface of the engagement portion 32 faces the dash portion 14.

Figure 8:
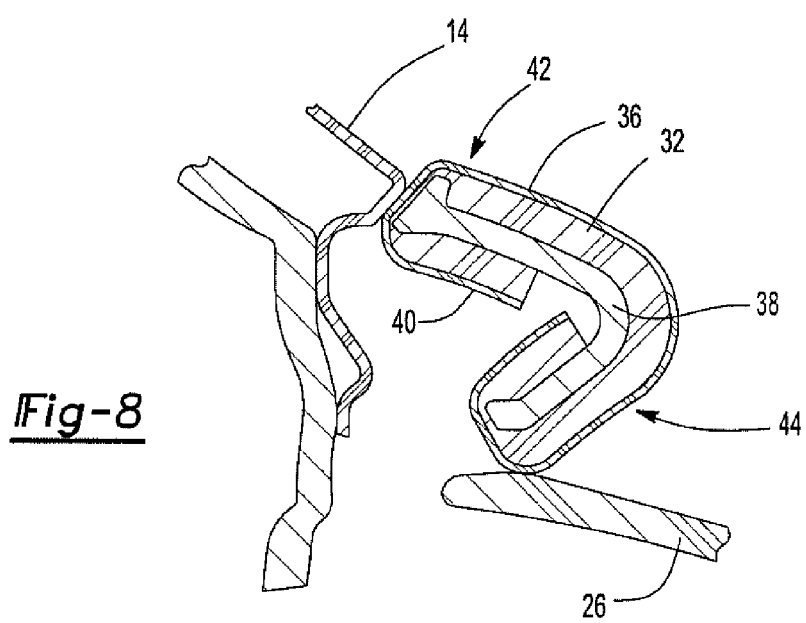
FIG. 8 is a partial cross-sectional view taken along the line 8-8 of FIG. 5.

With reference to FIG. 8, the component includes a molded substrate 38 having a generally C shaped arcuate cross section. A flexible cover 40 is wrapped around the molded substrate 38. The flexible cover 40 is optionally a woven or nonwoven flexible material illustratively including leather, leather synthetic, vinyl, or other synthetic or natural materials. With reference to FIGS. 6 and 7, the distal end 34 of the engagement portion 32 is spaced apart from the base 22 of the cutout portion 20 so as to provide an allowance for variations in dimensions of the flexible wrap cover 40. Specifically, if the component 30 is varied such that the engagement portion 32 is longer or shorter or that the flexible cover 40 is thicker or thinner, the space between the base 22 and the exterior surface 18, that is the length of the inner wall 24, allows for the cutout portion 20 to absorb the deviations while still providing a continuous connection between the component 30 and the instrument panel 12. In addition, the base 22 is provided at an acute angle with respect to the longitudinal axis of the engagement portion 32 as the cutout portion 20 is provided at the junction between the dash portion 14 and the hood portion 16.

With reference to FIGS. 5-7, the engagement portion 32 is provided with a first contact point P1 and a second contact point P2. The first contact point P1 is the point of contact between the upper portion 42 of the engagement portion 32 and the dash portion 14 of the instrument panel 12. The second contact point P2 is the point of contact between the lower portion 44 of the engagement portion 32 and the hood portion 16 of the instrument panel 12. As seen in FIGS. 4 and 5, upon connection of the component 30 to the instrument panel 12, the outer surface 36 of the engagement portion 32 is provided with continuous contact with the inner wall 24 of the cutout portion 20 between the first contact point P1 and the second contact point P2.

Accordingly, the unique configuration of the cutout portion 20 allows for the instrument panel 12 to provide a pleasant atheistic appearance with components 30 having differing dimensions, without modification to the instrument panel 12. Specifically, cutout portion 20 is capable of receiving a component 30 having a first flexible cover 40 and an alternative second component that has a second flexible cover having a different thickness characteristic from the first cover 40. Due to the recessing of the base 22 from the exterior surface 18 of the instrument panel 12, there is no need to modify the instrument panel 12 based on the type of flexible cover 40 that the component 30 is wrapped and still provides the continuous contact between the outer surface 36 of the component 30 and the inner wall 24 of the cutout portion 20.

The cutout portion 20 also capable of receiving a first component 30 and a second component that were manufactured by different suppliers. Due to the production of the components by separate manufactures, the components may have different dimensions; however, the cutout portion 20 is capable of absorbing the variations while providing the continuous contact between the outer surface 36 of the component 30 and the inner wall 24 of the cutout portion 20.

The present invention has been described in an illustrative manner. It is appreciated, of course, that although only a single component 30 and cutout portion 20 are illustrated, a second component and cutout portion may be formed at both sides of the hood portion 16. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

It is claimed:

1. An instrument panel assembly for an automotive vehicle, said instrument panel assembly comprising:
   an instrument cluster;
   an instrument panel having an exterior surface, said instrument panel includes a dash portion and a hood portion extending outwardly from said dash portion, said hood portion positioned above said instrument cluster;
   a cutout portion formed above said instrument cluster at a junction between said hood portion and said dash portion, said cutout portion having a base recessed from said exterior surface of said instrument panel, said cutout portion having an inner wall extending between said base and said exterior surface, a hood side portion of said inner wall adjacent said hood portion having a generally curved shape, said inner wall only partially bounding said base to define an open face positioned on a side of said base opposite said hood side portion; and
   a component attached to said dash portion of said instrument panel, said component including an engagement portion having a generally arcuate outer surface which corresponds to said curved shape of said hood side portion of said inner wall, said arcuate outer surface of said engagement portion is at least partially received within said cutout portion to provide continuous contact between said outer surface of said engagement portion and an inner surface of said inner wall of said hood side portion of said cutout portion.

2. The instrument panel assembly of claim 1, wherein said base is recessed from said exterior surface by a predetermined distance such that upon engagement of said engagement portion within said cutout portion a distal end of said engagement portion is spaced apart from said base.

3. The instrument panel assembly of claim 1, wherein said engagement portion has a longitudinal axis, and wherein said base has a generally planar surface that is oblique to said longitudinal axis of said engagement portion.

4. The instrument panel assembly of claim 1, wherein said component is a garnish pad.

5. The instrument panel assembly of claim 4, wherein said garnish pad is formed of a molded substrate wrapped with a flexible cover.

6. An instrument panel assembly for an automotive vehicle having a passenger compartment, said instrument panel assembly comprising:
    an instrument cluster;
    an instrument panel having an exterior surface, said instrument panel includes a dash portion and a hood portion extending outwardly from said dash portion, said hood portion positioned above said instrument cluster;
    a cutout portion formed above said instrument cluster at a junction between said hood portion and said dash portion, said cutout portion having a base recessed from said exterior surface of said instrument panel, said cutout portion having an inner wall extending between said base and said exterior surface, a hood side portion of said inner wall adjacent said hood portion having a generally curved shape, said inner wall only partially bounding said base to define an open face positioned on a side of said base opposite said hood side portion; and
    a garnish pad attached to said dash portion of said instrument panel, said garnish pad including an elongated engagement portion having a longitudinal axis, said engagement portion having a generally convex outer surface, an inner surface opposite said convex outer surface, and a distal end, said convex outer surface extending along said longitudinal axis of said engagement portion, and said convex outer surface corresponds to said curved shape of said hood side portion of said inner wall, said convex outer surface of said engagement portion is at least partially received within said cutout portion to provide continuous contact between said convex outer surface of said engagement portion and an inner surface of said inner wall of said hood side portion of said cutout portion;
    wherein upon attachment of said garnish pad to said dash portion of said instrument panel, said convex outer surface of said engagement portion is exposed to the passenger compartment of the automotive vehicle, and said inner surface of engagement portion faces said dash portion.

7. The instrument panel assembly of claim 6, wherein said base is recessed from said exterior surface by a predetermined distance such that upon engagement of said engagement portion within said cutout portion a distal end of said engagement portion is spaced apart from said base.

8. The instrument panel assembly of claim 6, wherein said base has a generally planar surface that is oblique to said longitudinal axis of said engagement portion.

9. The instrument panel assembly of claim 6, wherein said garnish pad is formed of a molded substrate wrapped with a flexible cover.

\* \* \* \* \*